No. 608,875. Patented Aug. 9, 1898.
G. C. O. LANGE.
PHOTOGRAPHIC SHUTTER.
(Application filed Dec. 20, 1897.)
(No Model.) 2 Sheets—Sheet 1.
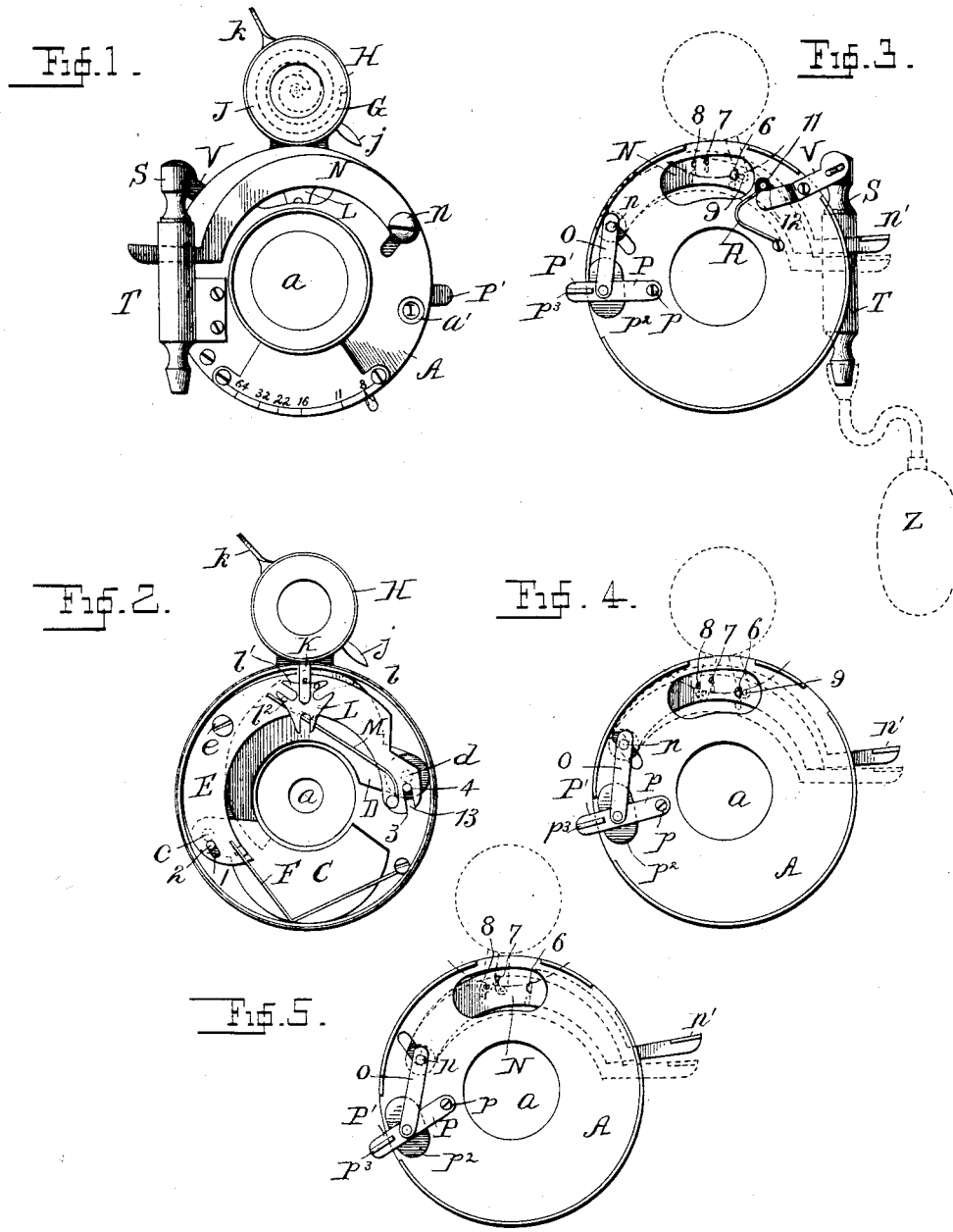

No. 608,875. Patented Aug. 9, 1898.
G. C. O. LANGE.
PHOTOGRAPHIC SHUTTER.
(Application filed Dec. 20, 1897.)

(No Model.) 2 Sheets—Sheet 2.

WITNESSES:
M. V. Bridgood
H. P. Hammond

INVENTOR
George C. O. Lange
BY
Harry E. Knight
ATTORNEY

UNITED STATES PATENT OFFICE.

GEORGE C. O. LANGE, OF CRESSKILL, NEW JERSEY, ASSIGNOR TO THE MANHATTAN OPTICAL COMPANY, OF NEW YORK, N. Y.

PHOTOGRAPHIC SHUTTER.

SPECIFICATION forming part of Letters Patent No. 608,875, dated August 9, 1898.

Application filed December 20, 1897. Serial No. 662,728. (No model.)

*To all whom it may concern:*

Be it known that I, GEORGE C. O. LANGE, a citizen of the United States, residing at Cresskill, county of Bergen, State of New Jersey, have invented certain new and useful Improvements in Camera-Shutters, of which the following is a specification.

This invention relates to improvements in camera-shutters, and relates particularly to the class of shutters wherein the exposure is made by a double movement of the shutter, the latter under the action of its actuating means first moving to expose the lens-aperture and then moving back to its original position to again cover said aperture, and the subsequent operation of the resetting devices serving to put the actuating means again in operative condition without disturbing the shutter. In such devices the operation of the shutter is started and controlled by controlling or releasing mechanism which is in turn controlled by a pneumatic bulb; and my invention comprises means whereby such releasing mechanism may be so shifted that instantaneous, time, and so-called "bulb instantaneous" exposures may be produced by the action of the same actuating, resetting, and releasing devices.

Figure 6:
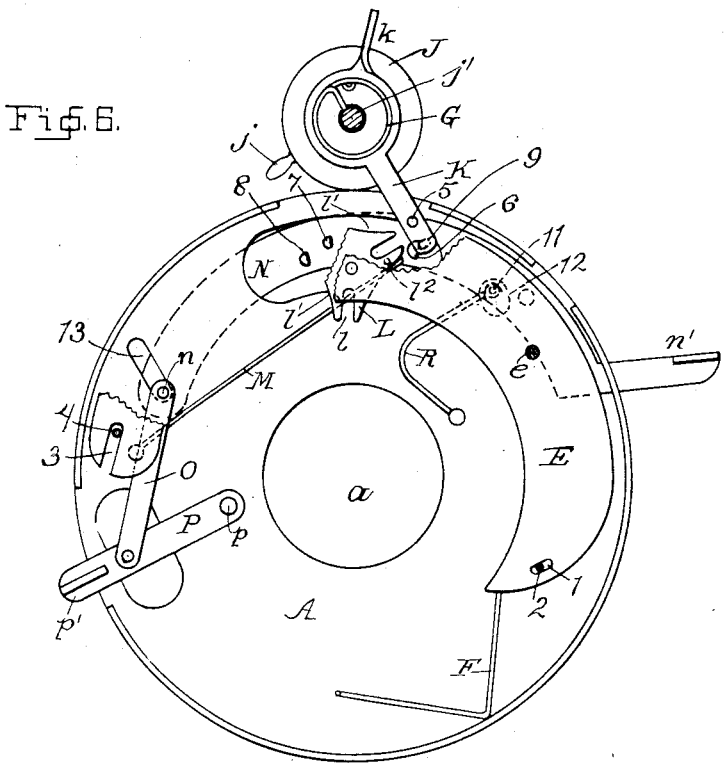
Figure 7:
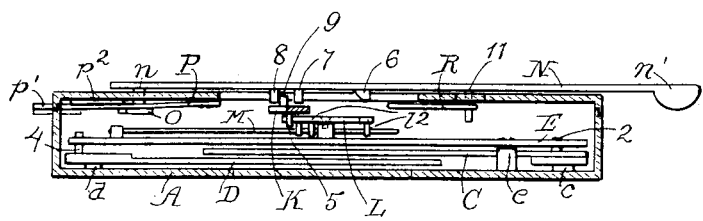

In the accompanying drawings, which form a part of this specification, Figure 1 is a front outside view of the shutter. Fig. 2 is a front view of the shutter mechanism with the cover removed. Figs. 3, 4, and 5 are rear views of the shutter-cover and attached mechanism in different positions, showing also in dotted lines the various positions of the actuating device. Fig. 6 is an enlarged rear view of the shutter-cover and attached mechanism, showing a part of the shutter-operating lever and the actuating device, but omitting the pneumatic controlling device. Fig. 7 is a top view of the shutter mechanism, also omitting the pneumatic controlling device, the casing and the actuating-arm being shown in section.

A represents the shutter-casing, which consists, as usual, of a back and a cover and which is attached to the usual lens and diaphragm attachments, which are adapted to present a central aperture $a$, whose closure or exposure by the shutter is the function of the mechanism hereinafter described.

The shutter device consists of a pair of wings C D, pivoted, respectively, to the casing at $c$ $d$ and capable of approaching one another so as to completely cover the aperture $a$ or of receding from one another so as to completely expose said aperture. A lever E, pivoted to the casing at $e$, has in one arm a slot 1, engaging with pin 2 on wing C, and in the other arm a slot 3, engaging with pin 4 on arm D. As the lever E turns one way or the other on its pivot $e$, its slots 1 3, engaging with pins 2 4, cause the wings C D to move simultaneously toward or away from one another. A spring F, engaging with lever E, tends to force same into a position which closes the shutter. To operate the lever E in the reverse direction, so as to open the shutter, there is provided an actuating device consisting of a spring G, contained in a separate box or casing H, and an arm or lever K, connected to and actuated by said spring and operating the lever E through the intervention of a trip device. This trip device may consist of a star-wheel L, mounted to rotate on lever E and having radial notches $l$ and cam-surfaces $l'$ between said notches and having also pins $l^2$, which engage with a spring M, which is secured at one end to the lever E. A pin 5 in the arm K engages with this star-wheel, and the spring M, acting on the pins $l^2$ of said wheel, tends to hold the star-wheel in such position that when the arm K turns in a direction to wind up the spring G the pin 5 thereon enters one of the notches $l$, and therefore does not tend to depress the lever E, but simply rotates the star-wheel on its axis, the spring M yielding sufficiently to allow such rotation and finally snapping said wheel into its normal position. Then when the arm K begins its backward movement its pin 5 engages on one of the cam-surfaces $l'$ and forces the star-wheel, and with it the lever E, downward, finally passing off from the cam-surface $l'$ and allowing the lever E to fly back under the influence of its spring F. The movement of this arm in one direction, therefore, simply winds the spring G and does not affect the shutter-operating lever, while its movement in the reverse direction under the influence of spring G depresses the lever E, thus opening the shutter, and finally releases said lever, allowing same to spring back and close the shutter. To set the arm or lever K against the action of its spring, it is provided with a handle $k$, extending through the side of the casing, so as to be accessible to the operator. When the arm E has been turned or reset so as to wind the spring G, it is held in that position, so as to be released and controlled at will by certain releasing mechanism, the special construction of which I will now describe. This releasing mechanism comprises a lever N, pivoted at $n$ to a link O, connected to an arm P, which is pivoted to the casing-cover at $p$. The end $p'$ of the arm P extends beyond the side of the casing to enable it to be operated, and the lever N may, as shown, be placed entirely outside the casing, the pivot $n$ of said lever extending through slot 13 in the cover of the casing. A spring R presses the handle end of lever N upward, this spring being attached at one end to the casing-cover and at the other end to the pin 11, projecting from lever N through a slot 12 in the said cover.

The lever N carries three stops or pins 6 7 8, which are arranged in succession thereon, and are capable of engaging with a pin 9 on arm K. As the arm or shiftable support P is turned one way or the other it shifts the pivot or fulcrum of lever E, and thereby moves the stops 6 7 8 in a direction transverse to the movement of the arm K. An up-and-down movement of the other end of lever N by means of its handle $n'$ will also cause the stops 6 7 8 to move transversely to the movement of the arm K. I have shown means for operating the lever N from the usual pneumatic bulb, the same consisting of lever V, engaging with pin 11 on lever N and connecting the lever N to a piston S, moving in a cylinder T, which is adapted to be connected to the pneumatic bulb Z in the usual manner. A plate $p^2$ on arm P carries in its front indicating-letters at I, B, and T, which appear one at a time through an opening $a'$ in the cover, according to the position of arm P, and a rib $p^3$ on the lower side of arm P engages in notches 13 in the side of the casing, (see Fig. 2,) so as to hold the said arm in any one of its several positions against accidental displacement. The stop 8 is, as shown, considerably offset in a direction transverse to the line of motion of detent or pin 9, and the stop 7 is still more offset, so that these stops are not in engaging relation with the detent 9 when the lever N is raised by the elevation of arm P to its top position. The adjustable arm P and link O thus constitute a shiftable support for the pivoted end of the lever, whereby the engaging relation of the stops thereon may be varied.

The spring G is secured at one end to the center stud $j'$, attached to the top J of the casing H, which turns with friction on said casing and has a handle $j$, whereby the tension of the spring may be adjusted, the frictional support of said top serving to hold it in any position in which it may be set.

The operation of the device is as follows: The arm or lever K is reset against the action of its spring by means of handle $k$ and is retained in such position by engagement of its pin 9 with stop 6 on lever N, as shown in Fig. 6, and the end $p'$ of arm P is placed in that one of its several positions which corresponds to the kind of exposure desired. If an instantaneous exposure is desired, the arm P is raised to its highest position, thereby lifting the pivoted end of lever N to the fullest extent, as shown in full lines in Fig. 3. During any such motion of the arm P the stop 6 on lever N remains in engagement with detent or pin 9 on arm K, the said stop 6 being wide enough to insure this. It will be observed in this connection that the motion of stop 6 during such movement of arm P is rather limited, as it is quite near the pin N, which is maintained by the spring R substantially at the upper end of the slot 12 during such movement. The stops 7 8 being farther away from the pin 11 receive a greater movement by the shifting of arm P, and when said arm is fully raised, as stated, the said stops 7 8 are carried out of the path of the pin 9 on arm K to such an extent that even when the lever N is depressed, as indicated by dotted lines in Fig. 3, the said stops 7 8 are clear of the path of motion of pin 9, the dotted line $x x$ here indicating the path of the top of said pin. Under these conditions when the lever N is depressed by means of its handle or by compression of its pneumatic bulb the stops 6 will be drawn down and away from pin 9 and the arm K will be driven by its spring G to the end of its stroke, thus depressing and then releasing the lever E and opening and closing the shutter, so as to give an instantaneous exposure.

The middle position of arm P corresponds to what is known as the "bulb instantaneous exposure." In this position the fulcrum end of lever N is so placed that when the lever N is depressed stop 7 will lie in the path of motion of pin 9; but when the lever N is raised both stops 7 and 8 will be out of said path, as shown by full lines in Fig. 4. Thus, assuming the releasing-lever N to be operated by manipulation of the pneumatic bulb, it will be seen that upon compression of this bulb the resultant depression of the lever N will cause the pin 9 to be released from stop 6 and to fly over to stop 7, when it is held while the bulb remains compressed. The arm K having engaged with a cam portion of the rotary trip device L has thereby depressed the lever E till the shutter-wings C D are opened to the fullest extent, and the arrest of motion of arm K by the stop 7 takes place when the lever is thus depressed, and the shutters open. As soon as the pressure on the bulb is released the lever N rises under the action of its spring R and the suction from the bulb, so as to lift stop 7 away from pin 9, upon which the arm K is driven to the end of its course, and in passing off of the trip device L releases the lever E, which is then thrown up by its spring F, so as to close the shutter-wings.

If an ordinary time exposure is desired, the arm P is shifted to its lowest position, bringing the lever N down so far that when the free end of said lever N is depressed the stop 7 will lie in the path of motion of pin 9; but when said lever is raised the stop 7 will move out of such path of motion, the stop 8, however, which is a little lower than stops 7, still remaining in the way of pin 9. If the arm K be now released by depression of lever N, as by compression of the bulb, the stop 7 will first arrest it in a central position, as above described, so as to start the exposure, and then when the pressure is taken off the bulb the lever E moves up and withdraws stop 7 from pin 9, which then flies over to stop 8, as shown in Fig. 7 and by the left-hand dotted position of the arm in Fig. 5. The resulting motion of the arm K is not enough to carry the pin 5 thereof off of the trip device L, and the shutter therefore remains open. When the exposure is to be terminated, the bulb is again pressed, and the resulting downward movement of lever E carries stop 8 down out of the way of pin 5, allowing arm K to complete its course of movement and cause the shutter to close.

Having thus described my invention, the following is what I claim as new therein and desire to secure by Letters Patent:

1. The combination with a camera-shutter and its actuating mechanism, of a lever having stops engaging with such mechanism so as to control same, a movable and adjustable support for the pivot of said lever, whereby the relation of its stops to the shutter-actuating mechanism may be varied and means substantially as described for retaining such movable support in the different positions to which it may be shifted.

2. In a shutter mechanism for cameras, the combination with a movable shutter, mechanism for operating said shutter, an arm engaging with said mechanism to actuate the shutter, actuating means for said arm, a lever carrying stops engaging with said arm, means for shifting the pivot of said lever in a direction transverse to the motion of said arm, and means for operating the free end of said lever in a direction transverse to the motion of said arm, whereby the lever may control the operation of the said arm, and the manner of its control may be varied by shifting the position of its pivot.

3. In a shutter mechanism for cameras, the combination with a shutter, of a movable controlling device operating the shutter, and a lever having a plurality of stops capable of engaging with said controlling device, and means for shifting the fulcrum of said lever.

4. In a shutter mechanism for cameras, the combination with a shutter device, of an arm controlling and operating same, and having a detent, a support shiftable transversely to the motion of said arm, and a releasing-lever pivoted to said support and having three stops, one capable of engaging with the aforesaid detent, in all positions of the shiftable support, and the other stops removed from engaging relation with the releasing-lever when the shiftable support is in one extreme position, but brought successively into engaging relation therewith as the shiftable support is moved toward its other extreme position.

5. In a shutter mechanism for cameras, the combination with a shutter device, of an arm controlling and operating same, and having a detent, a support shiftable transversely to the motion of said arm, and a releasing-lever pivoted to said support, and having three stops arranged in succession thereon, the first stop being wide enough to be in engaging relation to the detent in all positions of the shiftable support and the second and third stops being differently offset in a direction transverse to the motion of the detent, so that when the detent is released from the first stop it will pass the other stop or will engage with one or both of same according to the position of the shiftable support.

6. In a shutter mechanism for cameras, the combination with the shutter, and its operating device, of an actuating-lever and a spring for actuating same, and a rotary trip device having operative connection with the operating device and having peripheral portions engaging with the actuating-lever during the motion thereof in one direction, so as to cause rotation of said trip device without operation of the shutter, and peripheral portions engaging with the said lever during its motion in the opposite direction to cause operation of the shutter.

7. In a shutter mechanism for cameras, the combination with the shutter, and its operating-lever, of a star-wheel pivoted to said lever and having peripheral notches and cam-surfaces, an actuating-spring and a lever actuated thereby and engaging with said notches when moving in one direction and with said cam-surfaces when moving in the other direction, and a spring engaging with said star-wheel to bring it to proper angular position for engagement with the actuating-lever.

8. In a shutter mechanism for cameras, the combination with a shutter and an actuating device therefor, of a releasing-lever for said device having a series of stops arranged in succession thereon, to engage successively with said actuating device, and a shiftable support for said lever, consisting of a pivoted adjustable arm and a link pivoted to said arm and to said lever.

GEORGE C. O. LANGE.

Witnesses:
G. A. TAYLOR,
PERCY THORPE.